United States Patent [19]
Madden

[11] Patent Number: 5,542,737
[45] Date of Patent: Aug. 6, 1996

[54] AIR DEFLECTOR FOR THE REAR OF A VEHICLE

[76] Inventor: William R. Madden, R.R. 3, Hepworth, Ontario, Canada, N0H 1P0

[21] Appl. No.: 332,799

[22] Filed: Nov. 2, 1994

[51] Int. Cl.6 .................................................. B62D 35/00
[52] U.S. Cl. .......................... 296/180.1; 246/91; 246/208; 180/903
[58] Field of Search .................................. 296/91, 180.1, 296/180.4, 208; 180/903

[56] References Cited

U.S. PATENT DOCUMENTS

| | | | |
|---|---|---|---|
| 1,901,239 | 3/1933 | Hein | 296/208 |
| 3,059,562 | 10/1962 | Sturtevant et al. | |
| 4,309,053 | 1/1982 | Lett | 296/180.4 |
| 4,320,920 | 3/1982 | Goudey | 296/91 |
| 4,838,603 | 6/1989 | Masoero et al. | 296/180.1 |
| 5,171,057 | 12/1992 | Sharp | 296/91 |
| 5,199,762 | 4/1993 | Scheele et al. | 296/91 |

FOREIGN PATENT DOCUMENTS

| | | | |
|---|---|---|---|
| 3115742 | 11/1982 | Germany | 296/180.4 |
| 1426886 | 9/1988 | U.S.S.R. | 296/180.1 |

Primary Examiner—Gary C. Hoge
Attorney, Agent, or Firm—R. Craig Armstrong

[57] ABSTRACT

A forwardly-opening scoop is positioned at the upper rear of a snowplow or the like, and a downwardly directed duct portion communicates with it to direct air downwardly along the vertical rear wall of the truck. The device has multiple air outlets, to distribute the air to different areas, to maximize the cleaning effect. Preferably, the device extends down to cover the full height of the rear wall, and includes an air outlet at the bottom edge so that tail/brake lights are also washed by air. A reflective checkerboard preferably is displayed on the device.

6 Claims, 4 Drawing Sheets

AIR DEFLECTOR FOR THE REAR OF A VEHICLE

BACKGROUND OF THE INVENTION

This invention relates to a wind deflector for preventing the build-up of snow and ice on the back of snowplow trucks or other vehicles.

Because snowplows tend to travel at considerably slower speeds than other traffic, rear-end collisions are all too common, particularly but not only in blizzard conditions. To combat this, snowplow trucks are commonly equipped with an incredible array of bright flashing lights and reflectors. The vertical back wall of the plow is typically provided with a reflective warning pattern, such as a black and yellow checkerboard pattern. Despite these measures, each year there are a number of accidents, often quite serious, where drivers collide with the rear of the snowplow truck at high speed.

One would think that with the flashing lights and reflective checkerboard, such accidents would not occur. Of course, no matter what measures are taken, there will always be occasional accidents due to causes such as sleepy or intoxicated drivers. However, one problem with the present reflective checkerboard arrangement is that, in practice, the vortices created by the airflow around the moving snowplow truck deposit snow and ice onto the back of the plow, quickly obscuring the checkerboard and frequently obscuring the vehicle tail lights as well. Ice and snow build-ups up to eight inches or more are not unknown. The flashing lights, typically positioned on top of the vehicle, then become the primary warning device. Unfortunately, particularly in blizzard conditions, that may not always be enough to alert following drivers. Even if the drivers do see the flashing lights, problems of depth perception, particularly at night, may result in accidents.

It follows that it is highly desirable to prevent any accumulation of ice or snow on the reflective checkerboard.

The problem of ice and snow build-up in somewhat analogous situations is not unknown. For example, certain models of cars, particularly station wagons, have had problems with dirt and snow accumulation on the rear windows. U.S. Pat. No. 3,059,562 (Sturtevant et al.) shows a simple wind deflector which is mounted on the roof of the station wagon to deflect air downwardly across the rearwardly-angled windshield, to keep it clear from snow, ice and dirt.

SUMMARY OF THE INVENTION

In the invention, it was recognized that creating airflow along the rear wall of the truck could act to prevent the accumulation of snow and ice. However, hitherto there has been no satisfactory means of creating that airflow, to the best of the inventor's knowledge.

It is an object of the invention to provide a device which can be mounted on the snowplow truck or other vehicle to direct and distribute air across the rear of the vehicle. The invention involves a forwardly-opening scoop positioned at the upper rear of the vehicle to collect air, and a downwardly directed duct portion communicating with it to direct air downwardly along the vertical rear wall of the truck.

Preferably, the device has multiple air outlets, to distribute the air to different areas, to maximize the cleaning effect.

Preferably, the device extends down to cover the full height of the rear of the truck, with air outlets near the bottom thereof so that tail lights are also washed by air. A reflective checkerboard is displayed on the device itself.

Further features of the invention will be described or will become apparent in the course of the following detailed description.

It should be first appreciated that although the expressions "reflective checkerboard" or "checkerboard" are used throughout this specification, that is not intended to limit the use of this device to vehicles where there is such a checkerboard. The device obviously can be used to keep snow and ice from building up on the rear wall of a snow plow or other like vehicle, regardless of what pattern, if any, is on that rear wall.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
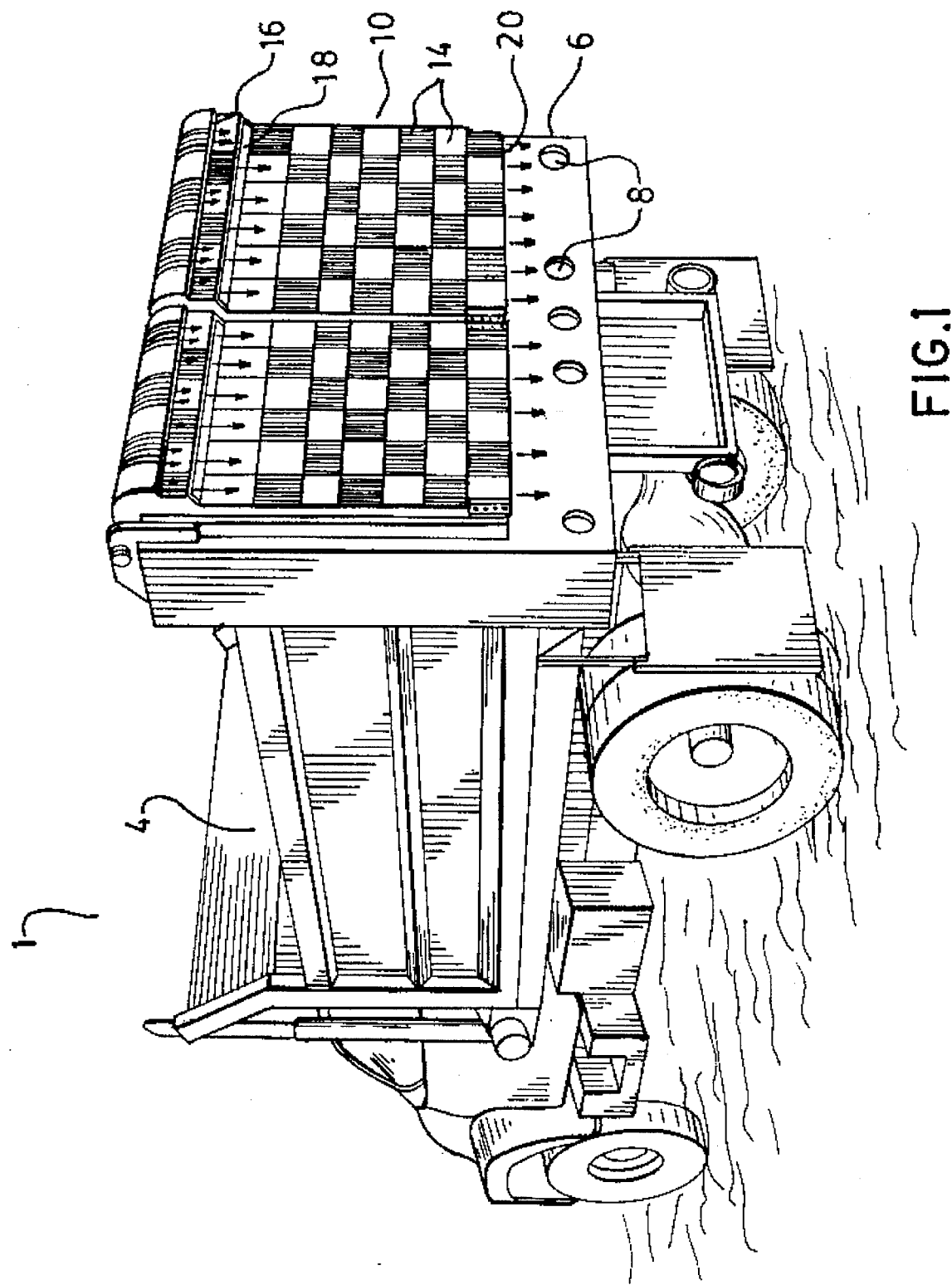
FIG. 1 is a perspective view of a typical snowplow truck, from the rear quarter, with the preferred embodiment of the invention installed.
Figure 2:
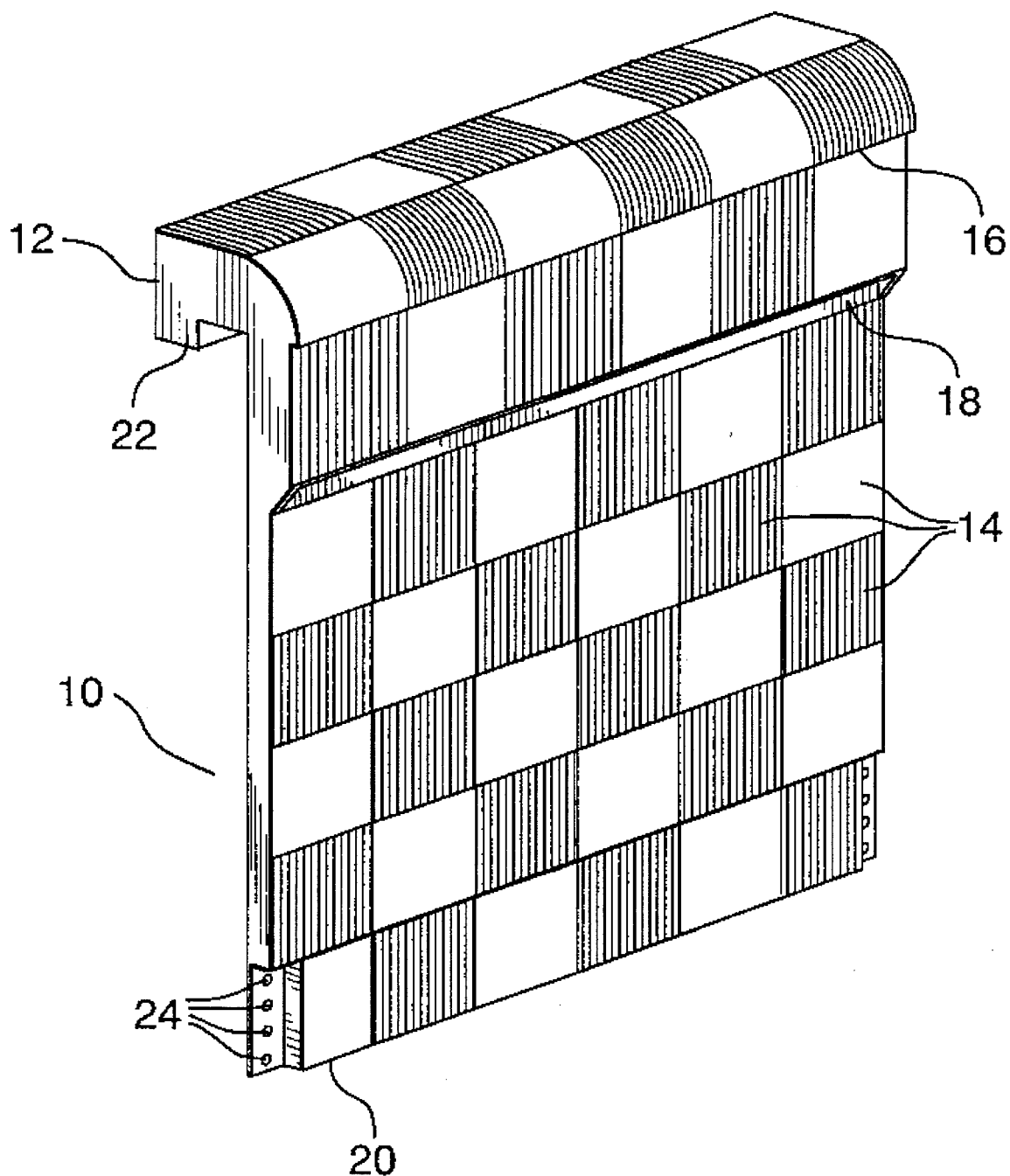
FIG. 2 is a perspective view of the preferred embodiment.

Referring to FIG. 1 of the drawings, a typical snowplow truck 1 is shown. The truck carries a snowplow in front of it (not shown), and has a truck box 4, including a generally vertical rear wall 6 and tail/brake lights 8. The device 10 of the invention involves a forwardly-opening scoop 12 positioned at the upper rear of the vehicle, to collect air and direct it downwardly along the wall.

Preferably, the device extends down to cover the full height of the rear wall 6. Since that means covering the reflective checkerboard on the truck box, the device itself preferably is provided with a reflective checkerboard 14.

Preferably, the device has multiple air outlets, to distribute the air to different areas, to maximize the cleaning effect by ensuring that there are generally no significant "dead" areas against the wall. In the preferred embodiment as illustrated, there is an upper outlet slot 16, an intermediate outlet slot 18, and a lower outlet slot 20 which washes the area of the tail/brake lights 8 with air.

Figure 3:
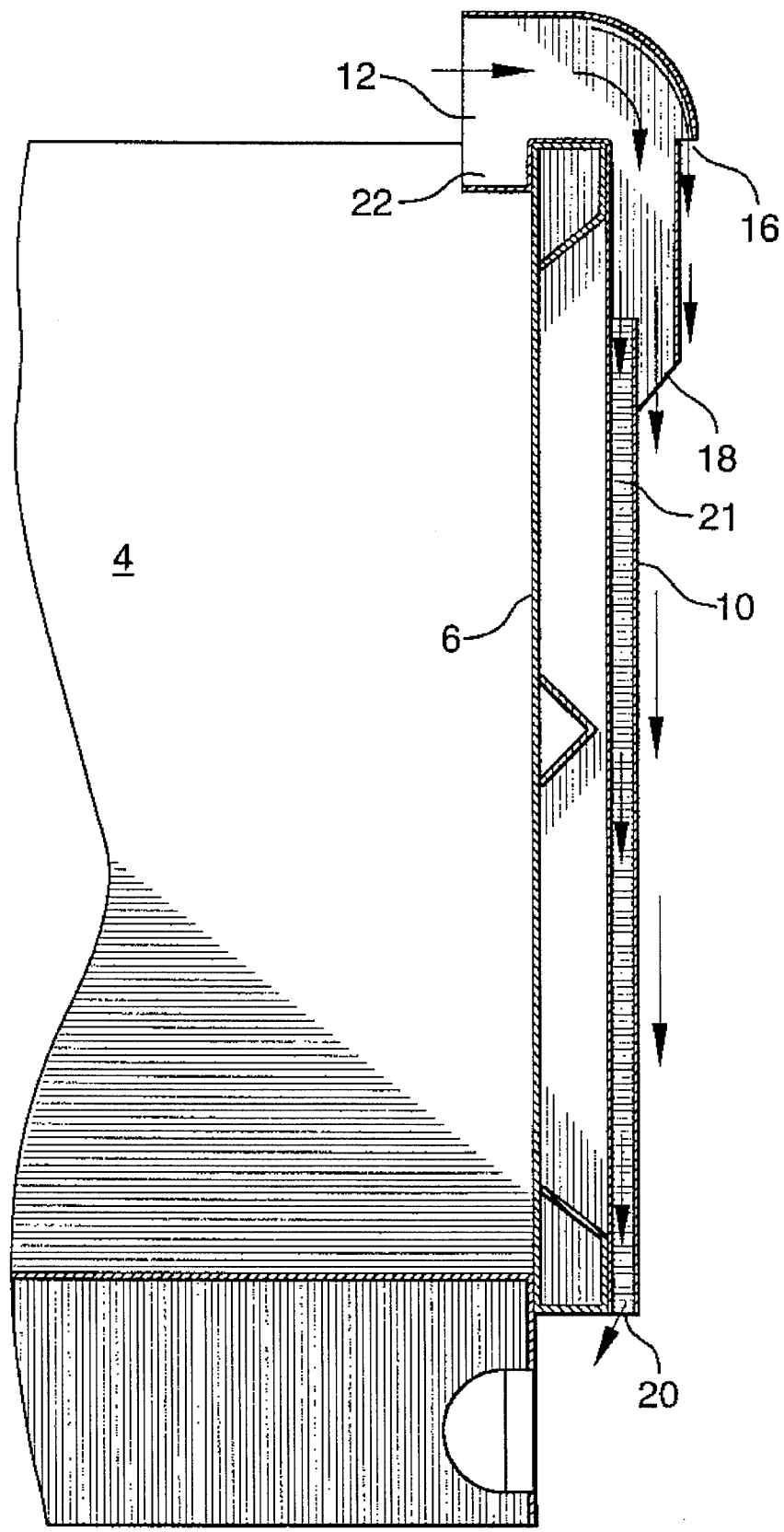
FIG. 3 is a side elevation view of the preferred embodiment, in cross-section, installed on the rear wall of the snowplow truck.
Figure 5:
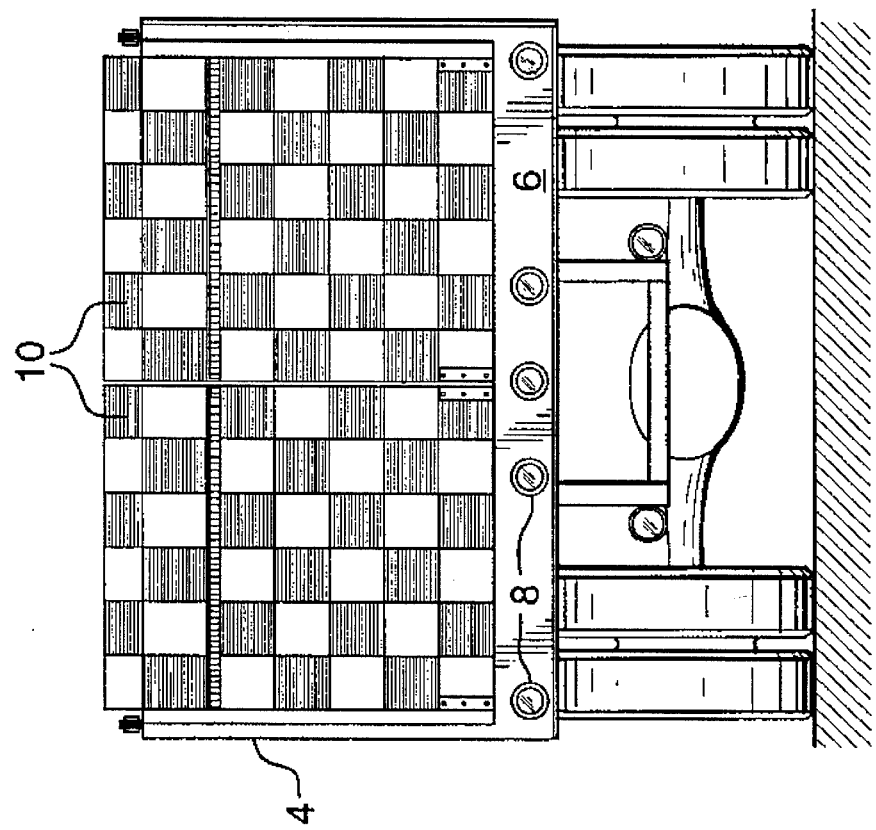
FIG. 5 is a rear view of the snowplow truck with the preferred embodiment installed.
Figure 4:
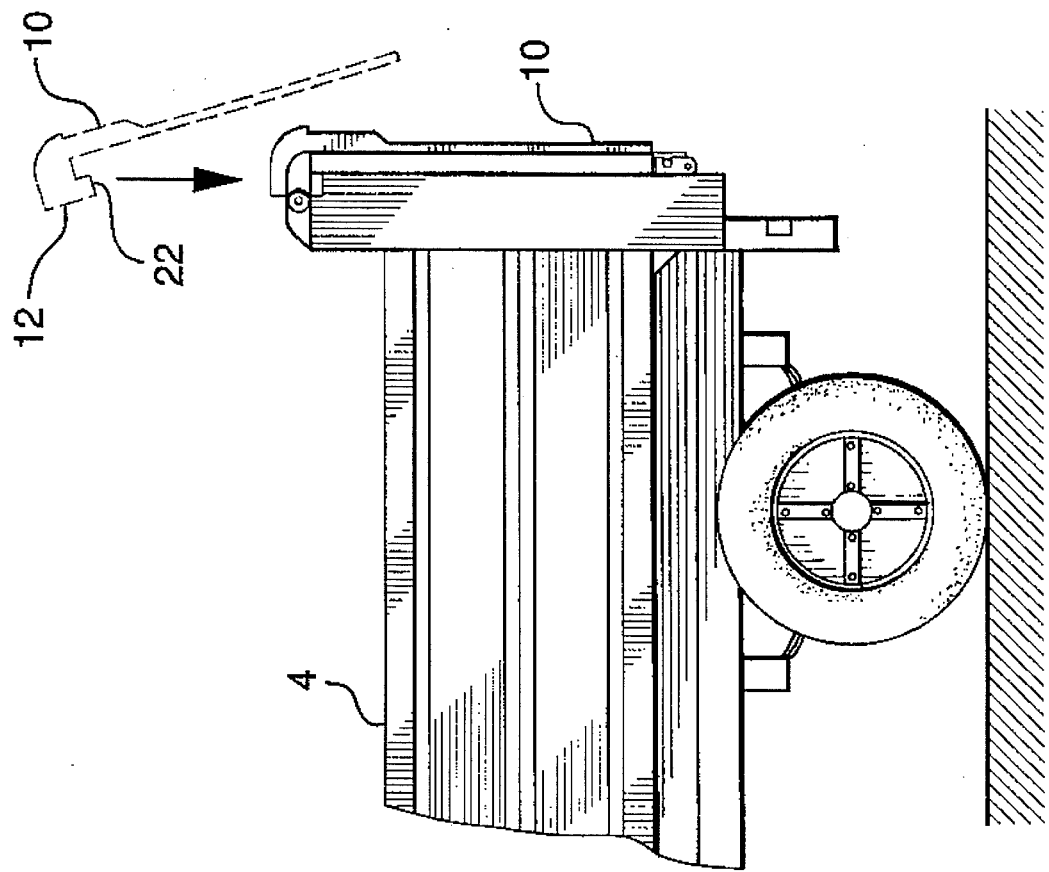
FIG. 4 is a side view of the snowplow truck, showing the method of installation of the preferred embodiment.

As can be seen best from FIG. 3, air enters the device via the scoop 12. A small portion of the air escapes via the upper slot 16, which is made quite narrow since the air escaping there is needed to wash only a relatively small area. Most of the air escapes via the intermediate slot 18, which is relatively large so that a substantial volume of air is directed downwardly along the checkerboard surface. A small portion of the air is picked up by the interior channel 21, to flow down the length of the device to wash the tail/brake light area, via lower outlet slot 20.

The device may be secured to the rear wall 6 by any suitable means. In the preferred embodiment, as one example, it has a downwardly-projecting lip 22 which fits over the top of the wall. The lower portion of the device is then bolted to the wall or frame elements thereof. To avoid deformation of the outer wall towards the inner wall, the device may be molded such that the outer wall projects inwardly against the inner wall in the area of the bolts. Alternatively, spacer sleeves could be used around the bolts.

To accommodate different rear wall sizes, a number of bolt locations 24 can be provided, with the correct ones for the job being selected at the time of installation.

The preferred embodiment lends itself readily to manufacture via rotational molding. The device is molded to its finished external shape and then the various openings, namely the scoop 12 and the outlets 16, 18, and 20 are cut through the plastic, using a router or any other desired cutting means.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, it should be clear that the specific configuration of outlets is not essential to the invention. There could be more outlets or fewer outlets, as desired. Multiple outlets are obviously preferable, however, and the configuration of the preferred embodiment is considered optimal.

What is claimed as the invention is:

1. A wind deflection device for the rear of a vehicle with a generally vertical rear wall, to prevent the build-up of snow, ice, dirt or the like on said wall, said device comprising:

a broad forwardly-opening scoop positioned at the upper rear of the vehicle, exposed to the airstream created when the vehicle is moving, to collect air from said airstream;

a rigid duct portion extending downwardly along the vertical rear wall of the vehicle and communicating with said scoop and receiving air therefrom;

a first air outlet from a bottom section of said duct portion for directing air downwardly out of said duct portion; and a second air outlet from a top section of said duct portion for directing air from said scoop downwardly along an exterior vertical surface of said duct portion.

2. A device as recited in claim 1, further comprising an intermediate air outlet partway down said duct portion.

3. A device as recited in claim 1, where said scoop has a forwardly-extending area with a lip projecting downwardly therefrom to hook over said rear wall.

4. A device as recited in claim 1, where said device is of rotationally molded plastic.

5. A device as recited in claim 1, where said downwardly extending duct portion is sufficiently long to cover substantially the full height of said rear wall.

6. A device as recited in claim 5, where a reflective checkerboard is displayed on the device itself.

* * * * *